(12) United States Patent
Takayama

(10) Patent No.: US 11,303,746 B2
(45) Date of Patent: Apr. 12, 2022

(54) TERMINAL APPARATUS THAT DISPLAYS WHICH COMMUNICATION SYSTEM IS AVAILABLE FROM MULTIPLE COMMUNICATION SYSTEMS BEING USED

(71) Applicant: SONY CORPORATION, Tokyo (JP)

(72) Inventor: Ryoya Takayama, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/491,669

(22) PCT Filed: Jan. 22, 2018

(86) PCT No.: PCT/JP2018/001734
§ 371 (c)(1),
(2) Date: Sep. 6, 2019

(87) PCT Pub. No.: WO2018/168200
PCT Pub. Date: Sep. 20, 2018

(65) Prior Publication Data
US 2020/0015308 A1   Jan. 9, 2020

(30) Foreign Application Priority Data

Mar. 13, 2017 (JP) .............................. JP2017-047677

(51) Int. Cl.
*H04M 1/72442* (2021.01)
*H04M 1/72448* (2021.01)
(Continued)

(52) U.S. Cl.
CPC .......... *H04M 1/72442* (2021.01); *H04B 5/02* (2013.01); *H04M 1/6041* (2013.01);
(Continued)

(58) Field of Classification Search
CPC ..... H04W 76/14; H04W 76/15; H04W 48/18; H04W 84/12; H04W 84/18;
(Continued)

(56) References Cited

U.S. PATENT DOCUMENTS

| | | | |
|---|---|---|---|
| 2005/0181734 A1* | 8/2005 | Coutts | H04W 48/18 455/67.16 |
| 2008/0064388 A1* | 3/2008 | Duarte | H04M 1/72466 455/425 |

(Continued)

FOREIGN PATENT DOCUMENTS

| | | |
|---|---|---|
| JP | 2015-106920 | 6/2015 |
| JP | 2016-225734 | 12/2016 |

(Continued)

OTHER PUBLICATIONS

Liu, Ning-Han et al., "Adaptive Music Recommendation Based on User Behavior in Time Slot", IJCSNS International Journal of Computer Science and Network Security, vol. 9 No. 2, Feb. 2009, pp. 219-227. (Year: 2009).*

(Continued)

*Primary Examiner* — Joshua Kading
(74) *Attorney, Agent, or Firm* — Sheridan Ross P.C.

(57) ABSTRACT

A terminal apparatus that can connect to an audio instrument by one or both of a first wireless communication system or a second wireless communication system having a bandwidth narrower than that of the first wireless communication system, the terminal apparatus being configured to determine whether or not the first wireless communication system is adopted for connection when a button to display a library is tapped, connect to the audio instrument by the first wireless communication system in a case where the determination result is affirmative, and connect to the audio (Continued)

instrument by the second wireless communication system in a case where the determination result is negative.

18 Claims, 3 Drawing Sheets

(51) Int. Cl.

| | | |
|---|---|---|
| *H04M 1/60* | (2006.01) | |
| *H04W 48/18* | (2009.01) | |
| *H04M 1/72412* | (2021.01) | |
| *H04W 76/15* | (2018.01) | |
| *H04B 5/02* | (2006.01) | |
| *H04W 76/14* | (2018.01) | |
| *H04W 84/18* | (2009.01) | |
| *H04W 84/12* | (2009.01) | |

(52) U.S. Cl.
CPC ... *H04M 1/72412* (2021.01); *H04M 1/72448* (2021.01); *H04W 48/18* (2013.01); *H04W 76/14* (2018.02); *H04W 76/15* (2018.02); H04M 1/6066 (2013.01); H04M 2250/02 (2013.01); H04M 2250/06 (2013.01); *H04W 84/12* (2013.01); *H04W 84/18* (2013.01)

(58) Field of Classification Search
CPC ........... H04M 1/72563; H04M 1/7253; H04M 1/6066; H04M 1/6041; H04M 1/72558; H04M 1/72527; H04M 2250/02; H04M 2250/06; H04M 1/72442; H04B 5/02
See application file for complete search history.

(56) References Cited

U.S. PATENT DOCUMENTS

| | | | |
|---|---|---|---|
| 2014/0189584 A1* | 7/2014 | Weng | G06F 3/04883 715/808 |
| 2015/0103816 A1* | 4/2015 | Nagara | H04B 15/00 370/343 |
| 2015/0106887 A1* | 4/2015 | Aslund | H04W 12/06 726/5 |
| 2015/0156299 A1 | 6/2015 | Abramo | |
| 2015/0181362 A1* | 6/2015 | Ho | H04S 7/307 381/1 |
| 2017/0017450 A1* | 1/2017 | Bostick | G06F 3/0484 |
| 2017/0245051 A1* | 8/2017 | Lang | H04R 3/00 |
| 2018/0205608 A1* | 7/2018 | Robinson | H04L 41/0823 |
| 2020/0059531 A1* | 2/2020 | Coster | G06F 9/44521 |

FOREIGN PATENT DOCUMENTS

| | | | | |
|---|---|---|---|---|
| JP | 3207728 | | 12/2016 | |
| WO | WO-2016122240 A1 * | | 8/2016 | ............ H04W 48/16 |

OTHER PUBLICATIONS

International Search Report prepared by the Japan Patent Office dated Feb. 2, 2018, for International Application No. PCT/JP2018/001734.

"Do Not Use Android in Initial Setting," Nikkei Business Publications, Inc., Mar. 14, 2015, pp. 71, 146 (no English translation available).

Tanaka et al., "iPhone 6S/6S Plus: 150 Tips," Feb. 5, 2016, p. 156-159 (no English translation available).

* cited by examiner

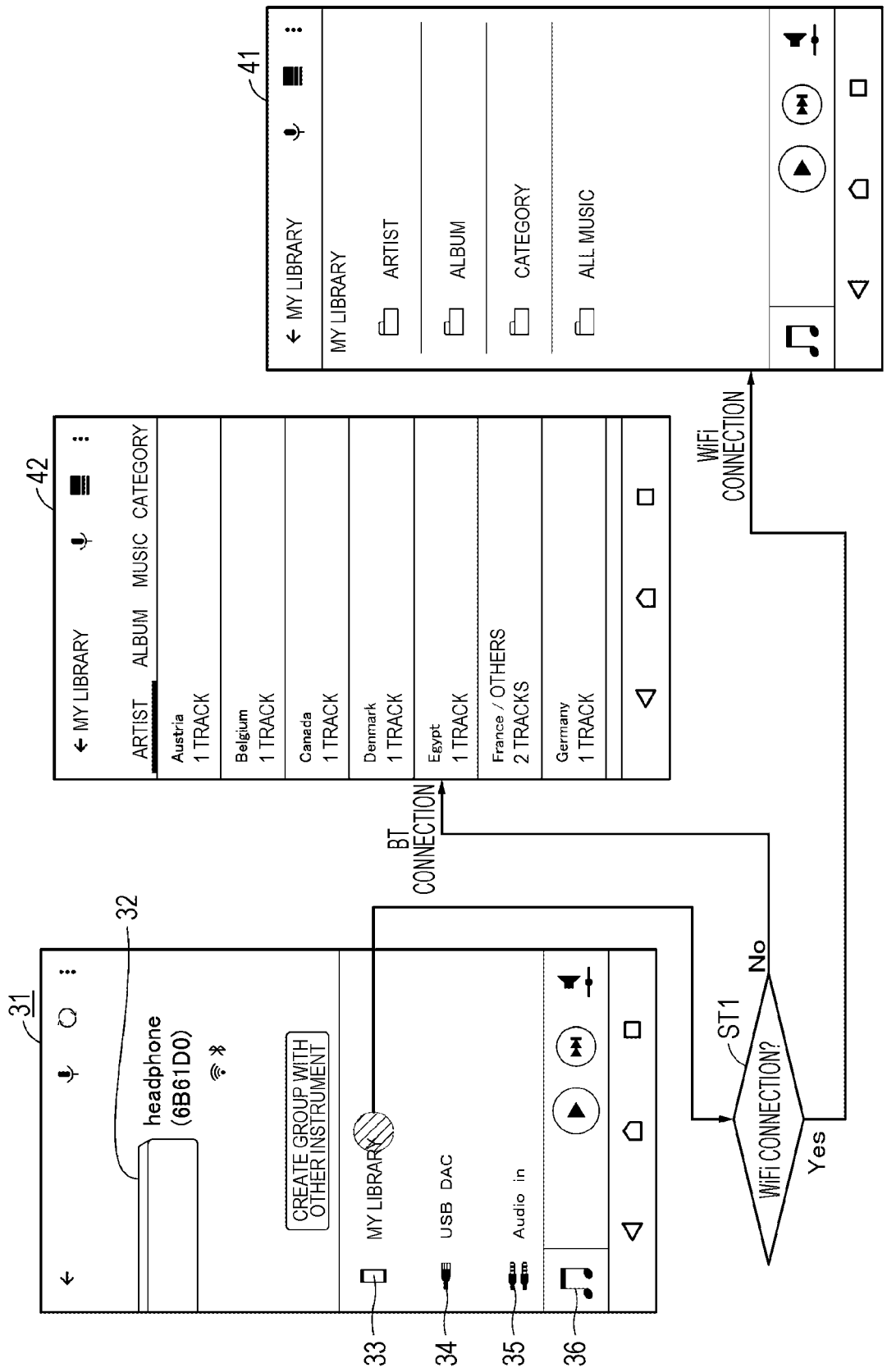

TERMINAL APPARATUS THAT DISPLAYS WHICH COMMUNICATION SYSTEM IS AVAILABLE FROM MULTIPLE COMMUNICATION SYSTEMS BEING USED

CROSS REFERENCE TO RELATED APPLICATIONS

This application is a national stage application under 35 U.S.C. 371 and claims the benefit of PCT Application No. PCT/JP2018/001734 having an international filing date of 22 Jan. 2018, which designated the United States, which PCT application claimed the benefit of Japanese Patent Application No. 2017-047677 filed 13 Mar. 2017, the entire disclosures of each of which are incorporated herein by reference.

TECHNICAL FIELD

The present technology relates to a terminal apparatus and a communication method applied to audio reproduction in, for example, a wireless environment.

BACKGROUND ART

Recently, the development of network technology has enabled audio reproduction to be performed wirelessly. For example, music retained in a smartphone is reproduced with an audio instrument, such as a speaker, through a wireless connection between the smartphone and the audio instrument. As a type of the wireless connection, Bluetooth (registered trademark) is known (hereinafter the term (registered trademark) is omitted to avoid complication).

For Bluetooth, "advanced audio distribution profile (A2DP)" exists as a profile for audio data. In the case of Bluetooth, since data volume that can be transmitted at one time is small, in other words, the bandwidth is narrow, audio data is compressed for transmission. The bandwidth is a bit rate available for transmission. For "A2DP", "SubBand Codec (SBC)" is defined as a mandatory codec system.

Since "SBC" prioritizes compression efficiency, "SBC" is insufficient as a codec system in terms of sound quality. However, since "SBC" is the mandatory system, there is an advantage in that audio data can be communicated between Bluetooth instruments without exception. As for Bluetooth, other codec systems such as AAC, for example, have been developed aiming improvement in terms of sound quality. Moreover, individual codec systems have been developed by manufacturers. Although improvement can be achieved in terms of sound quality by the use of these codec systems, instruments based on the Bluetooth standard may not be entirely compatible with these codec systems. Patent Document 1 describes establishment of communication by a plurality of communication systems.

CITATION LIST

Patent Document

Patent Document 1: Japanese Patent No. 5120474

SUMMARY OF THE INVENTION

Problems to be Solved by the Invention

As other types of wireless system, a wireless LAN, for example, "Wi-Fi" (registered trademark) (hereinafter, the term (registered trademark) is omitted to avoid complication and the term "wifi" is used) is known. Furthermore, as a standard (guideline) to facilitate interconnection between instruments of different manufacturers, "digital living network alliance (DLNA)" is known. Audio reproduction can be performed on the basis of DLNA between instruments connected by wifi.

In the case of wifi, since the bandwidth is wider than that of Bluetooth, transmitting audio data without compression and adopting a codec system with a high sound quality are possible. For a terminal such as an "Android" smartphone, a configuration supporting both Bluetooth and wifi is possible. In the case of a smartphone in which connections by both Bluetooth and wifi are allowed, it is preferable to select wifi connection in terms of sound quality. Furthermore, in a case where a wifi connection is not made when a user performs an operation to select wifi, conventionally, a message prompting to perform an operation for the wifi connection is displayed. However, when the Bluetooth connection is allowed, it is convenient for a user to perform audio reproduction by Bluetooth without performing wifi connection processing.

Therefore, the present technology provides a terminal apparatus and a communication method capable of using a connection of a communication system advantageous in terms of sound quality when two wireless communications are possible and of improving the operability of a user.

Solutions to Problems

The present technology provides a terminal apparatus that can connect to an audio instrument by one or both of a first wireless communication system and a second wireless communication system having a bandwidth narrower than that of the first wireless communication system, the terminal apparatus being configured to determine whether or not the first wireless communication system is adopted for connection when a button to display a library is operated, connect to the audio instrument by the first wireless communication system in a case where a determination result is affirmative, and connect to the audio instrument by the second wireless communication system in a case where the determination result is negative.

Furthermore, the present technology provides a communication method for performing a connection to an audio instrument by one or both of a first wireless communication system and a second wireless communication system having a bandwidth narrower than that of the first wireless communication system, the communication method including:

determining whether or not the first wireless communication system is adopted for connection when a button to display a library is operated;

connecting to the audio instrument by the first wireless communication system in a case where a determination result is affirmative; and connecting to the audio instrument by the second wireless communication system in a case where the determination result is negative.

Effects of the Invention

According to at least one embodiment, in a state where the terminal is connected to the audio reproduction apparatus by the first and the second communication systems, the first communication system having a narrower bandwidth can be preferentially selected. Note that the effects described herein are not necessarily limited, and may be any of the effects described in the present technology or effects different from them.

BRIEF DESCRIPTION OF DRAWINGS

FIG. 3 is a schematic diagram illustrating an example of a screen display according to the embodiment of the present technology.

MODE FOR CARRYING OUT THE INVENTION

Hereinafter, an embodiment and the like of the present technology are described with reference to the drawings. Note that the description will be made in the following order.
<1. Embodiment>
<2. Modification>
The embodiment and the like described below are preferred specific examples of the present technology, and the content of the present technology is not limited to the embodiment and the like described below.

1. Embodiment

Communication System

Figure 1:
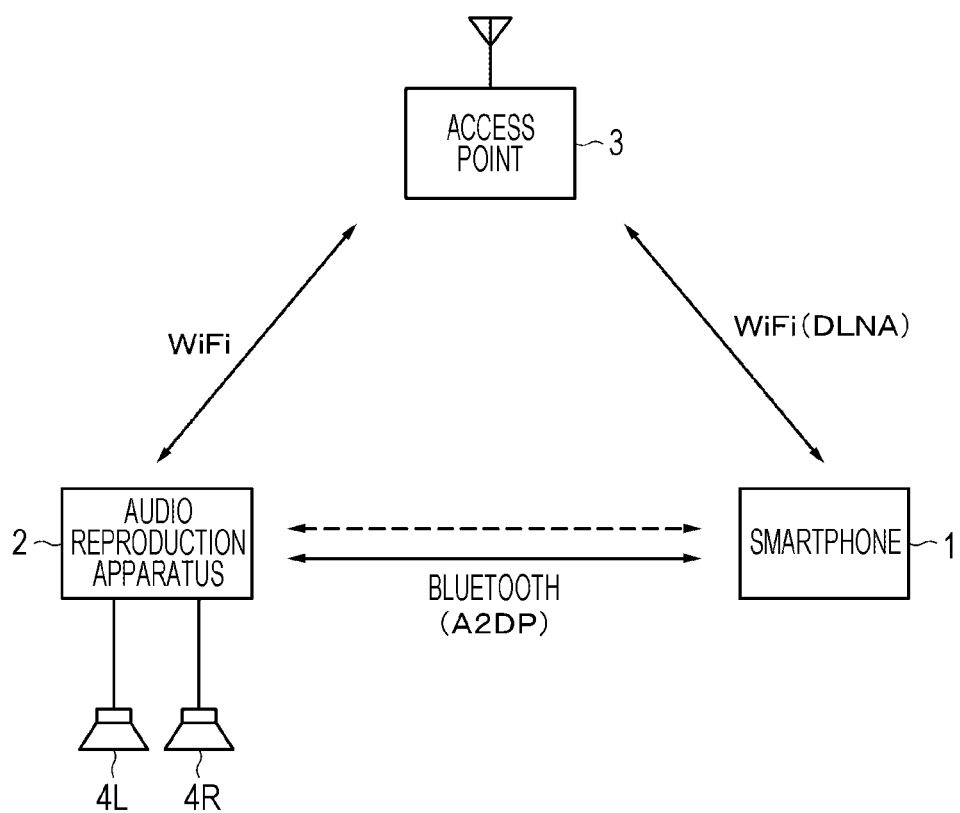
FIG. 1 is a block diagram illustrating a system configuration according to an embodiment of the present technology.

FIG. 1 illustrates a communication system of the embodiment of the present technology. A terminal apparatus such as a smartphone 1 is connected to an audio reproduction apparatus 2 as an audio instrument, by a wireless communication. The smartphone 1 uses Andoroid as an operating system (OS). However, the present technology can be applied to a tablet terminal, a mobile game machine, and the like, not limited to a smartphone.

A first wireless communication system between the smartphone 1 and the audio reproduction apparatus 2 is wifi. For example, the audio reproduction apparatus 2 is connected wirelessly via an access point 3. However, as illustrated with a dashed line, the smartphone 1 and an audio reproduction apparatus can also be connected without through an access point. Moreover, the audio reproduction apparatus 2 may use a receiver for wifi without having a wifi communication function. In the case of wifi, the smartphone 1 and the audio reproduction apparatus 2 are connected on the basis of DLNA.

A second wireless communication system between the smartphone 1 and the audio reproduction apparatus 2 is Bluetooth. For Bluetooth, a profile "A2DP" is used. Furthermore, "SBC" is used as a mandatory codec system; however, another codec system with a higher quality may be used.

Bluetooth has a bandwidth narrower than that of wifi, in other words, has a lower bit rate available for transmission. Accordingly, in a Bluetooth connection, data compressed by a codec system defined in Bluetooth in the smartphone 1 is transmitted to the audio reproduction apparatus 2. In the case of wifi, uncompressed audio data or audio data based on a compression system with a high sound quality is transmitted.

Audio Reproduction Apparatus

Figure 2:
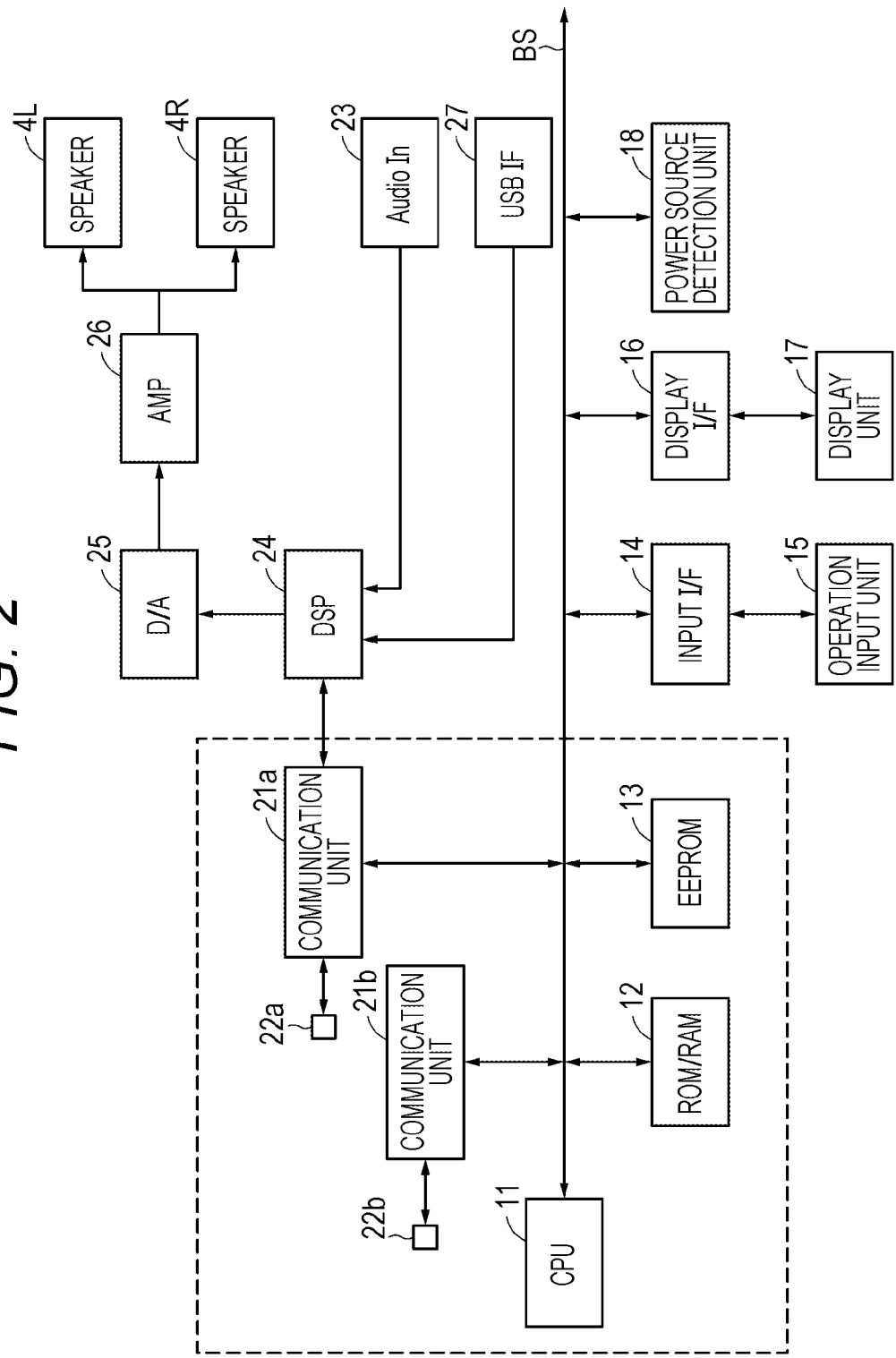
FIG. 2 is a block diagram of an example of an audio reproduction apparatus.

The audio reproduction apparatus 2 supports two wireless communication systems (Bluetooth and wifi). The audio reproduction apparatus 2 has speakers 4L and 4R. An example of a configuration of the audio reproduction apparatus 2 is illustrated in FIG. 2.

There are provided a central processing unit (CPU) 11 that is an example of a control unit, a read only memory (ROM)/random access memory (RAM) 12, an electrically erasable programmable read only memory (EEPROM) 13, an input interface (I/F) 14, an operation input unit 15, a display I/F 16, a display unit 17, a power source detection unit 18, a wifi communication unit 21a, a communication input and output unit 22a such as an antenna, a Bluetooth communication unit 21b, a communication input and output unit 22b such as an antenna, an audio input terminal (AUDIO IN) 23, a digital signal processor (DSP) 24, a digital to analog (D/A) 25, an amplifier (AMP) 26, the speaker 4L, and the speaker 4R. The CPU 11, the ROM/RAM 12, the EEPROM 13, the input I/F 14, the display I/F 16, the power source detection unit 18, and a mesh communication unit 21 are connected to each other via a bus BS.

The CPU 11 controls each unit of the audio reproduction apparatus. For example, the CPU 11 executes the above-described wifi communication function and Bluetooth communication function. The ROM/RAM 12 is a generic term for a ROM and a RAM. The ROM stores a program to be executed by the CPU 11. The RAM is used as a work area for the CPU 11 to execute the program, and is also used as a buffer memory for audio data. The EEPROM 13 memorizes information and the like regarding setting of the audio reproduction apparatus.

The input I/F 14 is an interface to output to the CPU 11 or the like an operation signal from the operation input unit 15. The operation input unit 15 is a generic term for a configuration that accepts an operation of a user performed with a key, a touch panel, a voice, a gesture, or the like. The operation signal is generated in response to the operation accepted by the operation input unit 15, and the generated operation signal is sent to the CPU 11 via the input I/F 14. The CPU 11 executes a control in response to the operation signal.

The display I/F 16 is an interface to output to the display unit 17 a display control signal regarding display. The display unit 17 executes a control in response to the display control signal supplied via the display I/F 16. The display unit 17 is, for example, a liquid crystal display (LCD) or an organic electro luminescence (EL). The display unit 17 may be configured as a touch panel, and an operation signal generated by using the touch panel may be supplied to the CPU 11 via the display I/F 16.

The wifi communication unit 21a communicates with the terminal (the smartphone 1) in accordance with the control of the CPU 11, and receives audio data from the terminal. The Bluetooth communication unit 21b communicates with the terminal (the smartphone 1) in accordance with the control of the CPU 11, and receives audio data from the terminal. The communication input and output units 22a and 22b are antennas or the like for performing communication.

The audio input terminal 23 is a terminal to which the audio data is input. To an audio data input terminal, audio data that is obtained through a compact disc (CD), a digital versatile disc (DVD), a semiconductor memory, the Internet, or the like is input. Moreover, via a universal serial bus (USB) interface 27, data of a USB memory can be imported.

The DSP 24 executes digital signal processing on audio data that is input from the communication unit 21a, the communication unit 21b, the audio input terminal 23, or the USB interface 27. Examples of the digital signal processing include processing for correcting the frequency characteristic of an audio signal by an equalizer and level adjustment processing. Note that in a case where the audio data input via the audio input terminal 23 and the like is analog audio data, the audio data is converted to digital audio data by, for example, an analog to digital (A/D) conversion function provided in the DSP 24.

The D/A 25 converts the audio data subjected to the signal processing by the DSP 24 to analog audio data. An output of the D/A 25 is supplied to the amplifier 26. Audio data is reproduced from the speakers 4L and 4R, the audio data being amplified by the amplifier 26 with a predetermined amplification factor.

Note that the audio reproduction apparatus illustrated in FIG. 2 is one example, and may have a configuration of another type of audio instrument such as a headphone.

Display and Control in Smartphone

Processing executed by an application software (hereinafter referred to as an "app") of the smartphone 1 is explained with reference to FIG. 3. After a wireless connection to the audio reproduction apparatus 2 is established by wifi or Bluetooth, a browsing display 31 illustrated in FIG. 3 is displayed on the screen of the smartphone 1. Note that, as a result of performing a wifi connection after a Bluetooth connection, or performing a connection in a reverse order, the smartphone 1 may be connected to the audio reproduction apparatus 2 by both wifi and Bluetooth communication systems.

The browsing display 31 includes an instrument button 32. The instrument button 32 is a button representing an instrument to which the other party is wirelessly connected (wifi and/or Bluetooth). More specifically, a photograph of the instrument, a type of the instrument, a model name, and the like of the other party are displayed. A browsing button 33 with the letters "My Library" is displayed. Tapping the browsing button 33 switches the screen to a browsing screen that displays an audio source list retained in a memory of the smartphone 1, as described later. Here, the audio source means information that is displayed on the basis of a tag such as music, an artist name, an album, and a category of the music.

A USB memory button 34 with the letters "USB DAC" is a button selected in a case where audio data stored in a USB memory is reproduced, the USB memory being mounted to the audio reproduction apparatus 2. A button with the letters "AUDIO IN" is a button selected in a case where audio data being input to the audio reproduction apparatus 2 is reproduced. Moreover, a button 36 is an area in which a jacket photograph, an artist name, an album title, or the like of an album of the music being reproduced is displayed. A control app installed in the smartphone 1 enables control of operation of the audio reproduction apparatus 2.

In the smartphone 1, when a user taps the browsing button 33 on the browsing screen 31, the control app of the smartphone 1 determines whether or not a wifi connection is available, as illustrated as step ST1. When the determination result is affirmative, in other words, when a wifi connection is determined to be available, a browsing screen 41 is displayed. The browsing screen 41 displays folders of an artist, an album, a category, and the like.

When the determination result in the determination step ST1 is negative, in other words, when a Bluetooth connection is determined to be available, a browsing screen 42 is displayed. The browsing screen 42 is a display in which an artist name, an album title, music title, and a category are displayed on the horizontal axis, and a country name is displayed on the vertical axis. Note that although these browsing screens 41 and 42 are different, the browsing screens 41 and 42 may also be the same. In order to achieve a single operation without being aware of which of the two wireless connections the user is connected to, it is preferable that the browsing screens be identical.

In the embodiment of the present technology, in a case where the smartphone 1 is connected to the audio reproduction apparatus 2 by wifi, the determination result of ST1 becomes affirmative, and the browsing screen 41 is displayed. The user can select desired music by selectively tapping the audio source list displayed on the browsing screen 41, and reproduce the selected music with the audio reproduction apparatus 2 by further tapping a reproduction button.

In a case where the smartphone 1 is connected to the audio reproduction apparatus 2 by Bluetooth, the determination result of ST1 becomes negative, and the browsing screen 42 is displayed. The user can select desired music by selectively tapping the audio source list displayed on the browsing screen 42, and reproduce the selected music with the audio reproduction apparatus 2 by further tapping a reproduction button.

In a case where the smartphone 1 is connected to the audio reproduction apparatus 2 by both wifi and Bluetooth, the determination result of ST1 becomes affirmative, and the browsing screen 41 is displayed. The user can select desired music by selectively tapping the audio source list displayed on the browsing screen 41, and reproduce the selected music with the audio reproduction apparatus 2 by further tapping a reproduction button.

As described above, in the embodiment of the present technology, in a case where a wifi connection has been established, the wifi connection is used in preference to Bluetooth. Accordingly, in a case where the smartphone 1 is connected to the audio reproduction apparatus 2 by both wifi and Bluetooth, the wifi connection, which is advantageous in terms of sound quality, can be selected. Note that, in a case where neither a wifi connection nor a Bluetooth connection is available, the browsing screen is not displayed.

Furthermore, regardless of which system is currently used for connection, the browsing button 33 is provided on the browsing screen 31 in common to wifi and Bluetooth, the browsing screen 31 being placed as the top screen of the app. Accordingly, the user can perform browsing by only pressing the browsing button 33 without being aware of the wireless connection system. In conventional terminal apparatuses, browsing buttons are separated according to the connection path. In other words, a browsing button for wifi and a browsing button for Bluetooth are separately provided. When a user taps the browsing button for wifi during a Bluetooth connection, the following message prompting a wifi connection is displayed, and the user needs to perform an operation for the wifi connection.

"Network connection is required to reproduce content in a mobile instrument. Perform network setting for the audio instrument by (Settings>Network Settings)".

The embodiment of the present technology has an advantage that the user does not need to be aware of the connection system and there is no need to perform the network setting.

2. Modification

As mentioned above, although one embodiment of the present technology has been specifically described above, the present technology is not limited to the above-described embodiment, and various modifications based on the technical idea of the present technology are possible. Furthermore, the configurations, methods, steps, shapes, materials, and numerical values described in the above embodiments are merely examples, and different configurations, methods, steps, shapes, materials, numerical values and the like may be used as required.

Note that the present technology may also have a configuration described below.

(1)

A terminal apparatus that can connect to an audio instrument by one or both of a first wireless communication system and a second wireless communication system having a bandwidth narrower than that of the first wireless communication system, the terminal apparatus being configured to determine whether or not the first wireless communication system is adopted for connection when a button to display a library is tapped, connect to the audio instrument by the first wireless communication system in a case where a determination result is affirmative, and connect to the audio instrument by the second wireless communication system in a case where the determination result is negative.

(2)

The terminal apparatus according to (1), in which the button to be tapped to display the library is common to the first wireless communication system and the second wireless communication system.

(3)

The terminal apparatus according to (1) or (2), in which the first wireless communication system includes wifi and the second wireless communication system includes Bluetooth.

(4)

The terminal apparatus according to any one of (1) to (3), including a mobile terminal having Android as an OS.

(5)

The terminal apparatus according to any one of (1) to (4), in which the library includes an audio source list retained by a terminal itself.

(6)

The terminal apparatus according to any one of (1) to (5), in which an audio source specified in the library is reproduced.

(7)

A communication method for performing a connection to an audio instrument by one or both of a first wireless communication system and a second wireless communication system having a bandwidth narrower than that of the first wireless communication system, the communication method comprising:

determining whether or not the first wireless communication system is adopted for connection when a button to display a library is tapped;

connecting to the audio instrument by the first wireless communication system in a case where a determination result is affirmative; and connecting to the audio instrument by the second wireless communication system in a case where the determination result is negative.

REFERENCE SIGNS LIST

1 Smartphone
2 Audio reproduction apparatus
4L, 4R Speaker
21a Wifi communication unit
21b Bluetooth communication unit
31 Browsing display
33 Browsing button
41, 42 Browsing screen

What is claimed is:

1. A terminal apparatus that can connect to an audio instrument by one or both of a first wireless communication system and a second wireless communication system having a bandwidth narrower than that of the first wireless communication system, the terminal apparatus comprising:
   a display;
   a processor; and
   a computer-readable storage device storing instructions which, when executed by the processor, cause the processor to be configured to:
   receive an indication that a connection has been made to the audio instrument by either the first wireless communication system or the second wireless communication system;
   generate a browsing screen on the display based on receiving the indication that a connection has been made to the audio instrument by either the first wireless communication system or the second wireless communication system,
   wherein the browsing screen includes an icon that when activated, generates an audio list screen associated with the first wireless communication system and an audio list screen associated with the second wireless communication system;
   after receiving activation of the icon, determine whether a connection has been made to the audio instrument by the first communication system;
   when the connection has been made to the audio instrument by the first wireless communication system, generate on the display the audio list screen associated with the first wireless communication system; and
   when a connection has not been made to the audio instrument by the first wireless communication system and a connection has been made to the audio instrument by the second wireless communication system, generate on the display the audio list screen associated with the second wireless communication system.

2. The terminal apparatus according to claim 1, wherein the first wireless communication system is connected to the audio instrument via an access point.

3. The terminal apparatus according to claim 1, wherein the audio instrument is a speaker and the first wireless communication system produces a higher sound quality for the speaker than the second wireless communication system.

4. The terminal apparatus according to claim 1, further comprising a computer operating system.

5. The terminal apparatus according to claim 1, wherein the audio list screens for the first and second wireless communication systems display an audio source list retained in a memory of the terminal apparatus.

6. The terminal apparatus according to claim 5, wherein the processor is further configured to reproduce an audio source specified in the audio source list.

7. The terminal apparatus according to claim 1, wherein the audio list screen associated with the first wireless communication system and the audio list screen associated with the second wireless communication system are the same.

8. The terminal apparatus according to claim 1, wherein the audio list screen associated with the first wireless communication system and the audio list screen associated with the second wireless communication system are different.

9. The terminal apparatus according to claim 1, wherein the processor is further configured
- receive an indication that a connection has been made to the audio instrument by both of the first wireless communication system and the second wireless communication system; and
- generate the browsing screen on the display based on receiving the indication that a connection has been made to the audio instrument by both of the first wireless communication system and the second wireless communication system.

10. A communication method for performing a connection between a terminal apparatus and an audio instrument by one or both of a first wireless communication system and a second wireless communication system having a bandwidth narrower than that of the first wireless communication system, the communication method comprising:
- receiving, by a processor, an indication that a connection has been made to the audio instrument by either the first wireless communication system or the second wireless communication system;
- generating, by the processor, a browsing screen on a display based on receiving the indication that a connection has been made to the audio instrument by either the first wireless communication system or the second wireless communication system,
- wherein the browsing screen includes an icon that when activated, generates an audio list screen associated with the first wireless communication system and an audio list screen associated with the second wireless communication system;
- after receiving activation of the icon, determining, by the processor, whether a connection has been made to the audio instrument by the first communication system;
- when the connection has been made to the audio instrument by the first wireless communication system, generating on the display, by the processor, the audio list screen associated with the first wireless communication system; and
- when a connection has not been made to the audio instrument by the first wireless communication system and a connection has been made to the audio instrument by the second wireless communication, generating on the display, by the processor, the audio list screen associated with the second wireless communication system.

11. The method according to claim 10, wherein the first wireless communication system is connected to the audio instrument via an access point.

12. The method according to claim 10, wherein the audio instrument is a speaker and first wireless communication system produces a higher sound quality for the speaker than the second wireless communication system.

13. The method according to claim 10, wherein the terminal apparatus further comprises a computer operating system.

14. The method according to claim 10, wherein the audio list screens for the first and second wireless communication systems display an audio source list retained in a memory of the terminal apparatus.

15. The method according to claim 14, further comprising reproducing, by the processor, an audio source specified in the audio source list.

16. The method according to claim 10, wherein the audio list screen associated with the first wireless communication system and the audio list screen associated with the second wireless communication system are the same.

17. The method according to claim 10, wherein the audio list screen associated with the first wireless communication system and the audio list screen associated with the second wireless communication system are different.

18. The method according to claim 10, further comprising:
- receiving, by the processor, an indication that a connection has been made to the audio instrument by both of the first wireless communication system and the second wireless communication system; and
- generating, by the processor, a browsing screen on the display based on receiving the indication that a connection has been made to the audio instrument by both of the first wireless communication system and the second wireless communication system.

* * * * *